Aug. 25, 1959 F. X. LAMB 2,901,705
INSTRUMENT CASE
Filed June 6, 1955 2 Sheets-Sheet 2
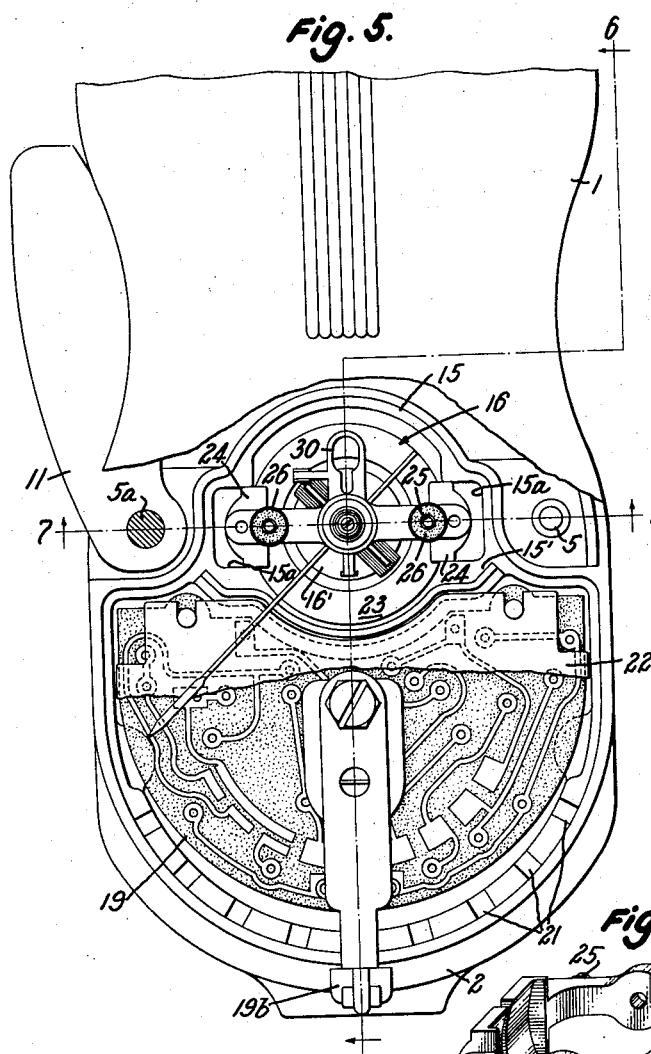
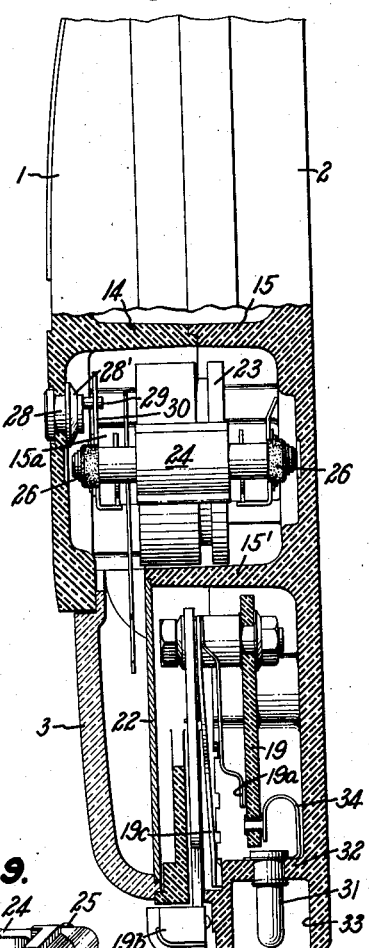
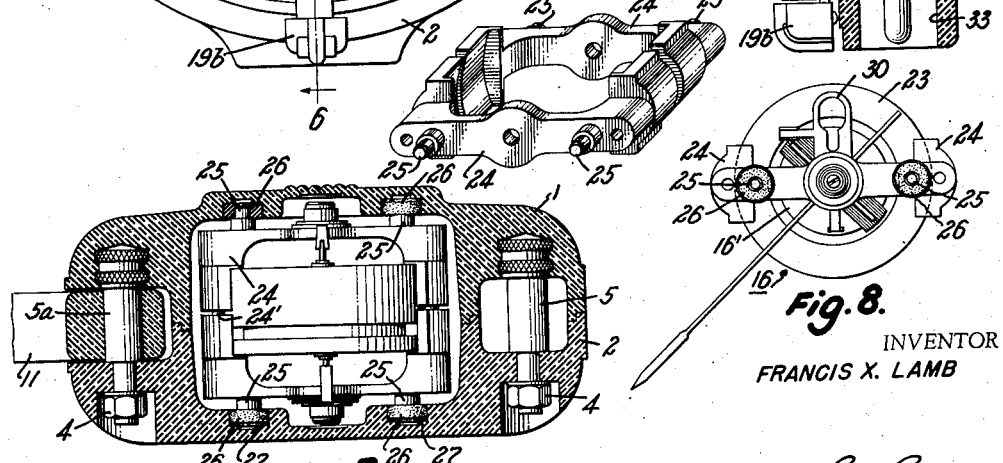
INVENTOR
FRANCIS X. LAMB
BY Rudolph J. Jurich
ATTORNEY ial No. 513,490

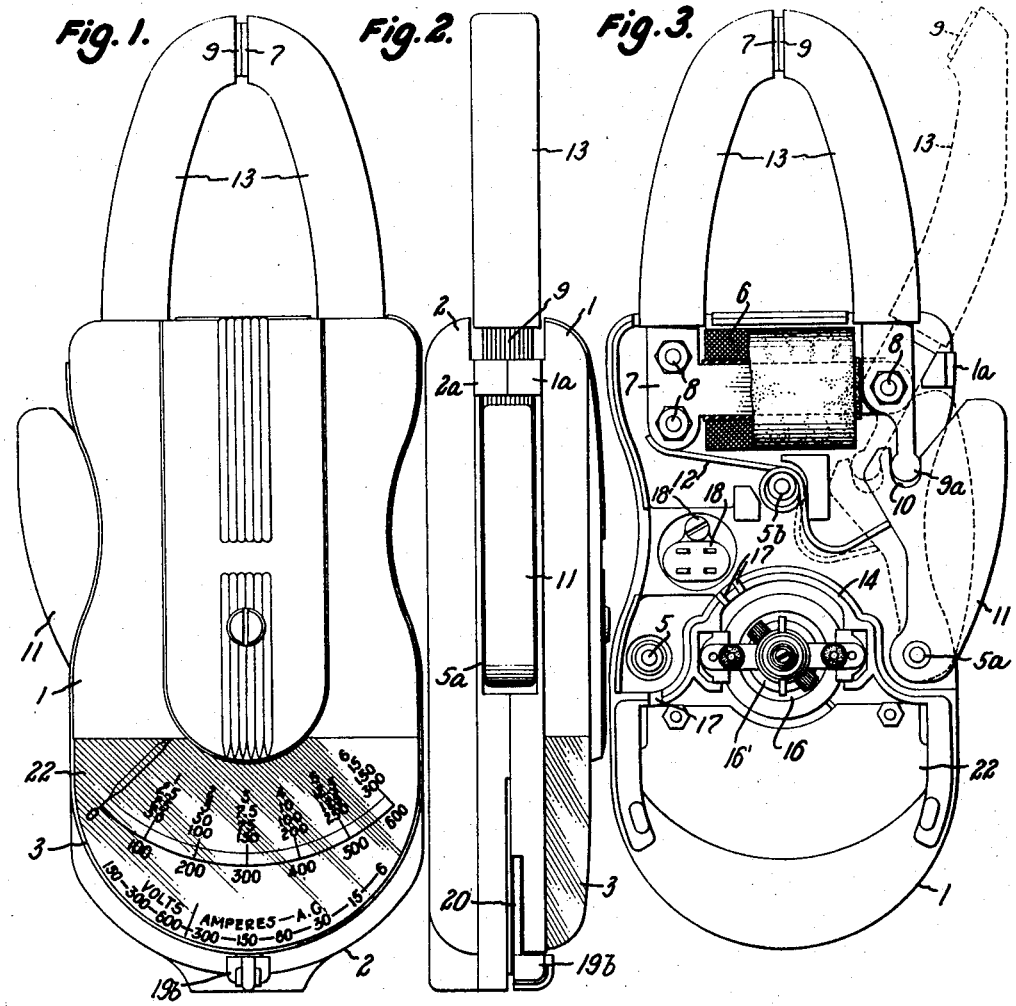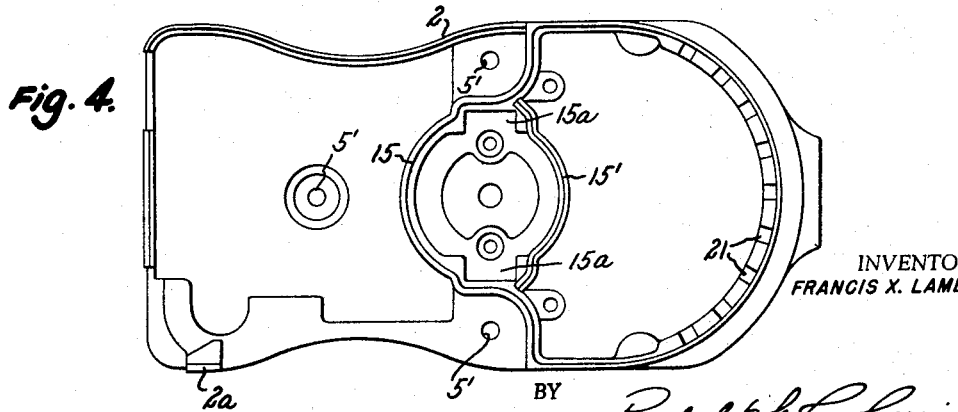

2 Claims. (Cl. 324—156)

This invention relates to instrument cases and more particularly to the mounting of the measuring instrument mechanism within a case.

An object of this invention is the provision of an instrument case of small size and made of complementary front and back domed sections with interior ribs forming a chamber within which a magnetic core type instrument is seated and resiliently supported when the case sections are secured to each other.

An object of this invention is the provision of a two-section instrument case in which a magnetic core type of instrument mechanism is mounted by the attachment of the case sections to each other, and without rigidly anchoring the instrument to either case section.

An object of this invention is the provision of an instrument case including a front and back section, and with studs having inner ends embedded in the front case section and extending through the rear case section to receive nuts to hold the case sections in assembled condition.

More specifically, an object of this invention is to provide an instrument case for a clamp-type meter which includes a bridge rectifier, the case comprising two domed and complementary sections having internal ribs forming chambers in which the rectifier and a magnetic core type instrument are seated, the instrument being securely held in the case upon connecting the case sections to each other.

These and other objects and the advantages of the invention will be apparent from the following specification when taken with the accompanying drawings illustrating an embodiment of the invention. It is to be understood that the drawings are for the purpose of illustration and are not to be construed as defining the scope or the limits of the invention, reference being had for the latter purposes to the appended claims.

In the drawings wherein like reference numerals denote like parts in the several views:

Figure 1 is a front elevation of a clamp volt-ammeter having an instrument case embodying the invention;

Figure 2 is a side view from the left of the same as viewed in Figure 1;

Figure 3 is an elevation of the instrument as seen when looking from the rear into the front case section after removal of the back case section;

Figure 4 is a view of the interior of the rear case section;

Figure 5 is a fragmentary front elevation of the instrument; part of the front case, the window and scale plate being broken away;

Figure 6 is a side elevation with parts in section as taken on line 6—6 of Figure 5, in the direction of the arrows;

Figure 7 is a transverse section through the instrument case on line 7—7 of Figure 5, in the direction of the arrows;

Figure 8 is a plan view of the magnetic core instrument mechanism; and

Figure 9 is a perspective view of the instrument bridges.

For the purposes of illustration, the invention is disclosed as embodied in a case for a clamp volt-ammeter as described and claimed in my co-pending application, "Clamp Volt-Ammeter," Serial No. 513,428, filed June 6, 1955, now Patent No. 2,842,739, dated July 8, 1958 but it is to be understood that the invention is of more general application and may be employed for the construction of cases for simpler types of magnetic core measuring instruments.

In the drawings, the reference numerals 1 and 2 identify, respectively, the front and back sections of the instrument case which preferably are molded from an opaque plastic. The lower portion of the front of the case comprises a separate semi-circular window 3 of glass or a transparent plastic which is held in position in any manner, not forming a part of the present invention, but preferably as described and claimed in the co-pending application of C. S. Peterson, Serial No. 513,195, filed June 6, 1955.

The case is of broad hour-glass shape, being wider at its ends than at its central section, and is held in assembled relation by nuts, not shown, threaded upon the ends of three studs 5, 5a and 5b which are stepped or varied in diameter, whose forward ends of largest diameter are desirably knurled or otherwise roughened so that they are anti-turningly embedded in the front section 1 of the case and which extend through openings 5′ in the rear section 2. The openings are of a diameter corresponding with the smallest stud diameter or that at the other ends. The case sections are deeply domed to provide space for the pre-wound secondary winding 6 which is fitted upon the short straight leg of the laminated soft iron tong 7 of approximately L-shape which is anchored within the front case section 1 by studs 8 having their forward ends embedded in the front case section 1. The movable tong 9 is also made of soft iron laminations, and one half of the laminations of each tong are cut away for a lap joint adjacent the right side of the case, as seen from the rear as in Figure 3 where the movable tong 9 is pivotally supported on the intermediate, or that portion of diameter smaller than the embedded end but larger than the other or nut-receiving end, of one of the studs 8 which secures the tongs and winding 6 to the case. The lower end of the movable tong 9 extends beyond its hinge connection to the fixed tong 7 and terminates in a cylindrical portion 9a seated in an upwardly opening recess 10 in a trigger 11 of molded plastic which is pivoted on the stud 5a.

The sides of the case sections 1 and 2 are cut back to provide a recess for free movement of the trigger 11 and their ends have complementary grooves for the passage of tongs 7 and 9; the outer edges of the grooves for the movable tong 9 being defined by integral portions 1a, 2a of the front and back case sections, respectively.

As shown in Figure 3, the coiled central portion of a torsion spring 12 is fitted over the stud 5b and thereby anchored within the case, and its ends bear against the tong 7 and the inner face of the trigger 11, respectively, to urge the latter into outer position, as shown in solid line, to hold the tongs in normally closed position. To open the tongs to place them about a current conductor, the central portion of the instrument case is tightly grasped in the hand, thereby moving the trigger 11 inwardly and rocking the moving tong 9 into open position as shown in dotted line. The tongs are covered with insulating sleeves 13 which preferably extend from a point adjacent their outer ends to and within the instrument case.

The case sections 1 and 2 are provided with complementary ribs 14 and 15, 15′ respectively which form an approximately cylindrical chamber in which a direct current measuring instrument mechanism 16 is mounted and the rib 14 has notches 17 through which wires extend to connect the secondary winding 6 with a bridge rectifier 18, the instrument 16 and the contacts of a range changing switch printed on an insulating material plate 19. The front or free edge of the rib 15' is notched, as shown in Figure 6, to form an inset for seating the upper edge portion of a scale plate flush with its front surface and provide a shoulder thereabove preventing undesired upward movement thereof. The bridge rectifier 18 is a unit assembly which is secured to the inner face of case section 1 by a screw 18' threaded into a bushing, not shown, embedded in the case section.

The switch blade 19a is adjustable by an insulating material handle 19b which extends through a slot formed between the case sections by cutting back the front case section, as indicated at 20 in Figure 2, and the inner surface of the back case section is provided with recesses 21 in which a resilient blade 19c seats to index the range change switch handle 19a. A multirange scale plate 22 is mounted back of the window 3 with its upper edge portion resting on the inset of the rib 15'.

Reverting to the measuring instrument 16, this preferably is constructed as described and claimed in the co-pending application of Francis X. Lamb and Paul Huber, Serial No. 448,964, filed August 10, 1954, "Electrical Instrument," and comprises a magnetized core 16' within and supported by a cylindrical soft iron yoke 23 upon which complementary bridge members 24 are fitted and secured to each other by a force fit upon connecting pins 24'. The bridge members 24 have integral, stepped projections 25 upon the outer ends of which resilient washers 26 are placed. The case sections have transversely alined recesses 27 molded therein in position to receive the projections 25 and washers 26, and the casing ribs 15 and 15' are shaped to provide lateral extensions 15a of the approximately cylindrical instrument chamber into which the sides of the bridge members 24 fit snugly and hold the instrument mechanism 16 tightly therebetween and spaced from the adjacent edge of the scale plate 22.

A zero corrector stud 28 is journalled in the wall of the front case section 1 in position for its eccentric pin 29 to enter the opening of the forward spring abutment 30 of the instrument when the latter is seated in its chamber in the front case section, the stud being retained in place by a resilient washer 28' which is fitted over its inner end.

The instrument is placed in the chamber of the front case section 1 and firmly pressed into place. The stud 28 is turned, if necessary, to aline the pin 29 with the opening of abutment 30, and the rear case section 1 is then placed on the front case section and the case is secured in assembled condition by threading nuts on the ends of studs 5, 5a and 5b. Undue pressure between the engaged edges of the complementary ribs, some of which are designated 14 and 15, see Figures 6 and 7, is avoided by the body of the back section 2 of the case first engaging the shoulders defined at the junctions between the nut-receiving and intermediate portions of said studs.

The instrument mechanism is thus resiliently supported within the case without the use of any screwed connections other than those employed to fasten the case sections to each other.

A pair of terminal studs 31 are embedded in a web 32 which is set back from the lower end of case section 2 to provide a chamber 33 for receiving the cable connector end of a pair of test prods, not shown, which are employed in making voltage measurements. The terminal studs 31, of which only one is shown in Figure 6, are alined in a plane parallel to the insulating material plate 19 and each has a spring clip 34 mounted on its inner end and shaped to make connection with a selected contact printed on plate 19 when the latter is mounted within the case. The construction of the range change switch elements forms no part of the present invention but is described and claimed in the co-pending application of R. F. Estoppey and F. M. Bender, Serial No. 513,484, filed June 6, 1955.

Having now described my invention in detail in accordance with the Patent Statutes what I desire to protect by Letters Patent of the United States is set forth in the following claims.

I claim:

1. A clamp-type meter having a case comprising a front domed section, a complementary back domed section, said sections being of molded plastic with transversely aligned recesses in their inner surfaces, laminated tongs anchored to the front case section, one of said tongs being fixed and carrying a secondary winding, the second tong being hinged to the first tong, an electric instrument mechanism of the magnetized core type having complementary bridge members with outstanding stepped projections and between which said mechanism is gripped, ribs on the inner face of one of said case sections defining a chamber for receiving said mechanism, one of said ribs having an inset at its free edge to seat an edge portion of a scale plate and provide a shoulder limiting movement thereof, resilient washers snugly fitted upon the outer ends of said projections in position to fit within said recesses when the instrument is placed within said chamber and the case sections are assembled, a scale plate for said mechanism with an edge portion received in said inset and spaced from said mechanism, studs having heads embedded in the front case section, intermediate portions of smaller diameter than that of said heads and having rearwardly projecting threaded ends of still smaller diameter and at which the intermediate portions define shoulders, said rear case section being provided with openings through which the threaded ends of said studs pass, and nuts threaded upon the threaded ends of the studs to secure the case sections to each other, with the body of the back case section engaging said shoulders.

2. The invention as recited in claim 1, wherein said electrical instrument mechanism has an apertured spring abutment movable for zero correction, in combination with a zero corrector stud pivotally mounted on one of said case sections and having an eccentric pin extending into the aperture of said spring abutment.

References Cited in the file of this patent

UNITED STATES PATENTS

| | | |
|---|---|---|
| 1,307,685 | Letord | June 24, 1919 |
| 2,326,263 | Steiner | Aug. 10, 1943 |
| 2,352,049 | Weaver | June 20, 1944 |
| 2,383,364 | Bechman | Aug. 21, 1945 |
| 2,491,453 | Knobel | Dec. 13, 1949 |
| 2,517,171 | Bernreuter | Aug. 1, 1950 |
| 2,663,845 | Koch | Dec. 22, 1953 |
| 2,704,349 | Sheehan | Mar. 15, 1955 |
| 2,792,549 | Bernreuter | May 14, 1957 |